Sept. 1, 1936.  W. T. EXTON  2,053,140

JAR SEALING RING

Filed Aug. 22, 1933

INVENTOR
William T. Exton
By Green & McCallister
His Attorneys

Patented Sept. 1, 1936

2,053,140

UNITED STATES PATENT OFFICE 2,053,140

JAR SEALING RING

William T. Exton, Webster Groves, Mo., assignor to Ball Brothers Company, a corporation of Indiana Application August 22, 1933, Serial No. 686,213

2 Claims. (Cl. 288—1)

This invention relates to sealing rings for jars and more particularly to improvements in sealing rings for fruit jars and other containers adapted to be hermetically sealed and to a process for making such rings.

At the present time sealing rings for fruit jars are commonly made from a single rubber compound having such hardness and toughness as to provide a body stiffness to withstand the requirements of the various methods of home canning. The usual procedure employed in manufacturing such sealing rings is to extrude a single rubber stock into a tube having the proper diameter and wall thickness. After the tube has been extruded a curing mandrel or core is inserted into the tube commonly called the "sticking process", and the rubber is then vulcanized. The mandrel is inserted in the tube for the purpose of retaining the shape of the tube during the vulcanizing process, after which it is removed and the tube cut into rings of the desired thickness. The die employed in the extruding of the stock may be so formed that a longitudinally extending ridge is formed along one side of the tube so that when the tube is cut into rings, a lip will be formed on the ring to facilitate placing the rings on the jars and in removing them therefrom.

This process of making jar sealing rings is not only relatively slow and expensive due to the time and expense involved in sticking or inserting the mandrel or core into the unvulcanized tube but also rubber extruded in this manner is so very apt to have blow-holes, or other porosity caused by air being trapped in a thick, single, flange of stock. These blow-holes, etc., are frequently overlooked when the tube is cut and as a result, defective rings are often sent out to the trade.

Further, these rings are made from relatively hard and tough rubber stock and are not capable of being compressed or indented sufficiently to effect a seal between the jar and the jar cap or lid and this is especially so when the shoulder of the jar or the edge of the lid or cap or both, are uneven. The same is true when the ring itself is thicker on one side than on the other even though the variation in thickness be slight. The rings now in use do not have sufficient resiliency to take up the unevenness of the coacting surfaces and "leakers" are often encountered which results in loss unless the contents of the jars are reprocessed and transferred into perfect equipment.

It is, however, necessary that the rings be made of hard, tough rubber stock to give the body of the ring sufficient stiffness to hold it in sealing position between the lid and jar under all conditions encountered in the various processes of home canning. If the ring is made entirely of a relatively soft rubber having sufficient elasticity and compressibility to take up the unevenness of the shoulders of the jar and of the edges of the lids, it is apt to be displaced or forced out of its sealing position by the pressure on the inside of the jar, since it does not have sufficient body stiffness to hold it between the lid and the shoulder on the jar. Such forcing out of the ring, known as blow-outs, causes a failure and loss of the contents of the jar.

It is an object of my invention to provide a sealing ring for fruit jars and other containers which will effectively seal the jar or can on which it is applied and preserve the contents or the edge of the jar cap.

Another object is to provide a sealing ring for fruit jars which will have sufficient body stiffness to prevent blow-outs and which is still capable of being compressed sufficiently to take up uneven surfaces in the jars, caps or in the rings themselves.

A further object is to provide a compound sealing ring, the rubber in which is arranged in annular bands with the rubber in the middle band being softer than the rubber in the inner and outer band.

A still further object is to provide a method of manufacturing compound sealing rings.

A still further object is to provide a novel method of manufacturing sealing rings having a softer rubber center band with tougher rubber marginal bands on each side thereof.

A still further object is to provide a process for making sealing rings which is simple to practice and much more economical than any of the processes now in use.

These and other objects which will be hereinafter made more apparent in this particular art are accomplished by means of this invention, one embodiment of which is described in the following specification and illustrated in the accompanying drawing wherein.

Figure 2:
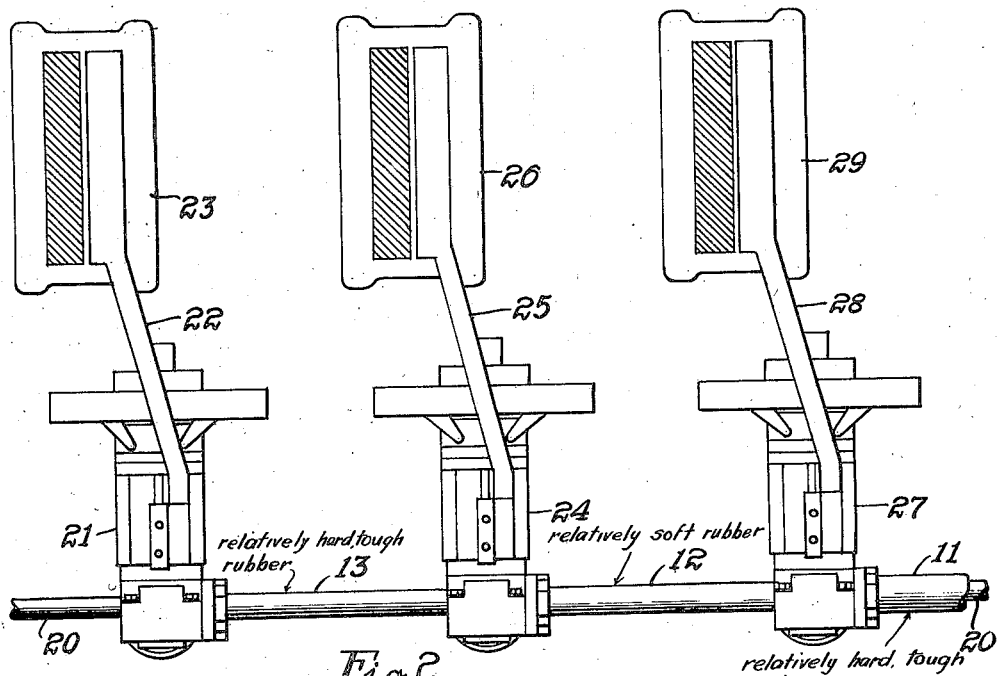
Fig. 2 is a diagrammatic view of an apparatus which may be employed in carrying out my process for making jar sealing rings.
Figure 3:
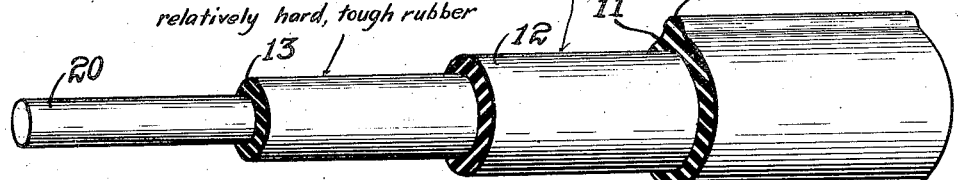
Fig. 3 is a perspective view partially in section illustrating the manner in which the ring tube is formed.

In general my invention resides in a compound sealing ring for fruit jars which is made in bands with the center of the ring formed of a relatively soft rubber and the inner and outer peripheries thereof of a relatively hard, tough rubber. The softer center gives the ring the compressibility necessary to take up the unevenness of the coacting sealing surfaces and the harder marginal bands give a stiffness to the body of the ring sufficient to prevent "blow-outs". The rings are cut from a tube which is made by extruding a thin layer of a relatively hard, tough rubber on a mandrel in substantially the same way that a rubber insulation is placed on a wire. A thin layer of relatively soft rubber is then deposited upon the first layer of rubber and then another layer of relatively hard rubber is placed on top of the softer layer. After the three layers of rubber have been extruded onto the mandrel the rubber is vulcanized to unite the layers into a solid tube. The mandrel is then removed and the tube cut transversely of its axis into rings of the desired thickness each of the rings having harder, tougher inner and outer peripheries and a softer center.

Rings made in accordance with my invention, when applied to a jar will not "blow out", since they have sufficient body stiffness due to the inner and outer peripheries being of a relatively hard, tough rubber, to withstand the pressures on the inside of the jar or container and will take up the unevenness of the shoulders of the jar and/or cap, since the center is relatively soft and is capable of being compressed.

Referring to the drawing in detail, I have disclosed a jar sealing ring 10 of non-porous rubber which is made in accordance with my invention and comprises an outer marginal band 11, a center band 12 and an inner marginal band 13.

The inner and outer bands 11 and 13 of the ring are made from a relatively hard, tough rubber for the purpose of giving sufficient stiffness to the ring 10 to prevent it from being displaced by the pressure encountered on the inside of a fruit jar during home canning, while the center band 12 is made from relatively soft rubber to secure the degree of compressibility necessary to take up any unevenness in the sealing surfaces whereby the jar will be effectively sealed and the contents thereof preserved.

In order to facilitate positioning the ring 10 on a fruit jar or removing it therefrom, a lip 14 is provided on the outer band 11 of the ring of such size that it may be readily grasped between the fingers to pull the ring over the neck of a jar.

In the manufacture of my improved sealing ring, I form a laminated tube by extruding a series of thin non-porous rubber layers upon a mandrel 20. The mandrel 20 is fed through a tubing machine 21 which is supplied with rubber through a conveyor 22 leading from a warming mill 23, having a relatively hard, tough rubber compound therein. The tubing machine 21 is of the type commonly employed in placing rubber insulation on a wire and as the mandrel passes therethrough, a thin layer of relatively hard, tough rubber forming the inner band 13 of the sealing ring is extruded onto the mandrel. After the first layer of rubber is positioned on the mandrel 20, it is fed through a second tubing machine 24 similar to the tubing machine 21, which is supplied with a relatively soft, pliable rubber through a conveyor 25 leading from a warming mill 26.

The tubing machine 24 extrudes a thin layer of softer rubber over the layer of harder rubber on the mandrel and forms the soft center band 12 of the sealing ring. When the soft layer of rubber has been deposited on the mandrel 20, it is fed through a third tubing machine 27 substantially the same as the tubing machines 21 and 24. The tubing machine 27 is supplied with a rubber compound through a conveyor 28 leading from a warming mill 29, having a compound of relatively hard, tough rubber therein, and a third thin layer of rubber, corresponding to the band 11 of the ring, is deposited on the mandrel. After the three layers of rubber have been deposited one on top of the other on the mandrel 20, the laminated tube so formed is vulcanized to join and unite the thin layers of rubber together. The mandrel is then removed and the tube is then cut into rings of the desired thickness for sealing fruit jars and the like.

Figure 1:
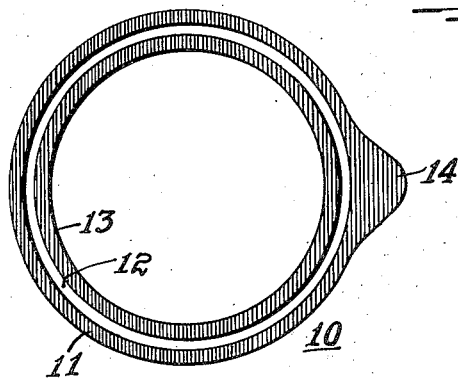
Figure 1 is a plan view of a sealing ring embodying my invention.
Figure 4:
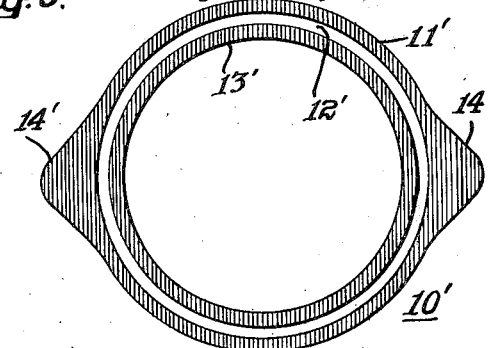
Fig. 4 is a plan view of a sealing ring embodying a modification of my invention.

In order that the rings may be readily positioned on the neck of the fruit jar or removed therefrom, the die on the tubing machine 27 may be so formed that one or more longitudinally extending ridges will be formed on the tube, which when the tube is cut form the lips 14 and 14' of the rings 10, and 10' as shown in Figs. 1 and 4.

While, in the process of making my sealing ring, I have described the mandrel as being fed separately through each of the tubing machines 21, 24, and 27, it is to be understood that these machines may be so arranged that as the front end of the mandrel 20 leaves the tubing machine 21, it will be guided into the tubing machine 24 and from there into the tubing machine 27 and they may be so spaced that each tubing machine is acting on a portion of the mandrel at the same time.

Further, while in the process of making my sealing ring, I have described the mandrel as being fed through each of the tubing machines 21, 24, and 27, it is understood that the entire process can also be carried out on a single tubing machine, by laying aside the mandrel between each covering operation, then making the necessary changes in the die set-up and the changes of stocks on the warming mill for the next operation, and thereby, completing the entire process on a single tubing machine.

It is apparent from the foregoing description that I have provided a sealing ring which will effectively seal the jar and preserve the contents thereof regardless of the unevenness of the coacting surfaces between the lid and the jar, since the soft rubber center is capable of being displaced and forced or squeezed into the space between the neck of the fruit jar and around the edge of the lid, thus making an effective lock and seal. It is also apparent that I have provided a process for making a soft center sealing ring which eliminates the expensive sticking operation and as a result much time and labor will be saved and no machinery will be needed to carry out the "sticking" operation in my process.

It is apparent too, that I have provided a process which eliminates blow-holes or other porosity in sealing rings by building up the flanges in thin layers of rubber instead of extruding a single stock of thick rubber of the proper diameter and wall thickness.

What I claim as new and desire to secure by Letters Patent is:

1. A jar sealing member composed of three peripherally-engaged rings of non-porous rubber concentrically arranged and vulcanized into an integral whole, the intermediate ring being relatively softer than the inner and outer rings.

2. A composite sealing ring formed of a series of peripherally-engaged annular non-porous rubber bands of different hardness, concentrically arranged and having their engaging peripheries vulcanized together.

WILLIAM T. EXTON.